April 12, 1949. J. H. ANDRESEN, JR 2,467,179
AUTOMATIC POSITION INDICATOR
Filed March 30, 1945
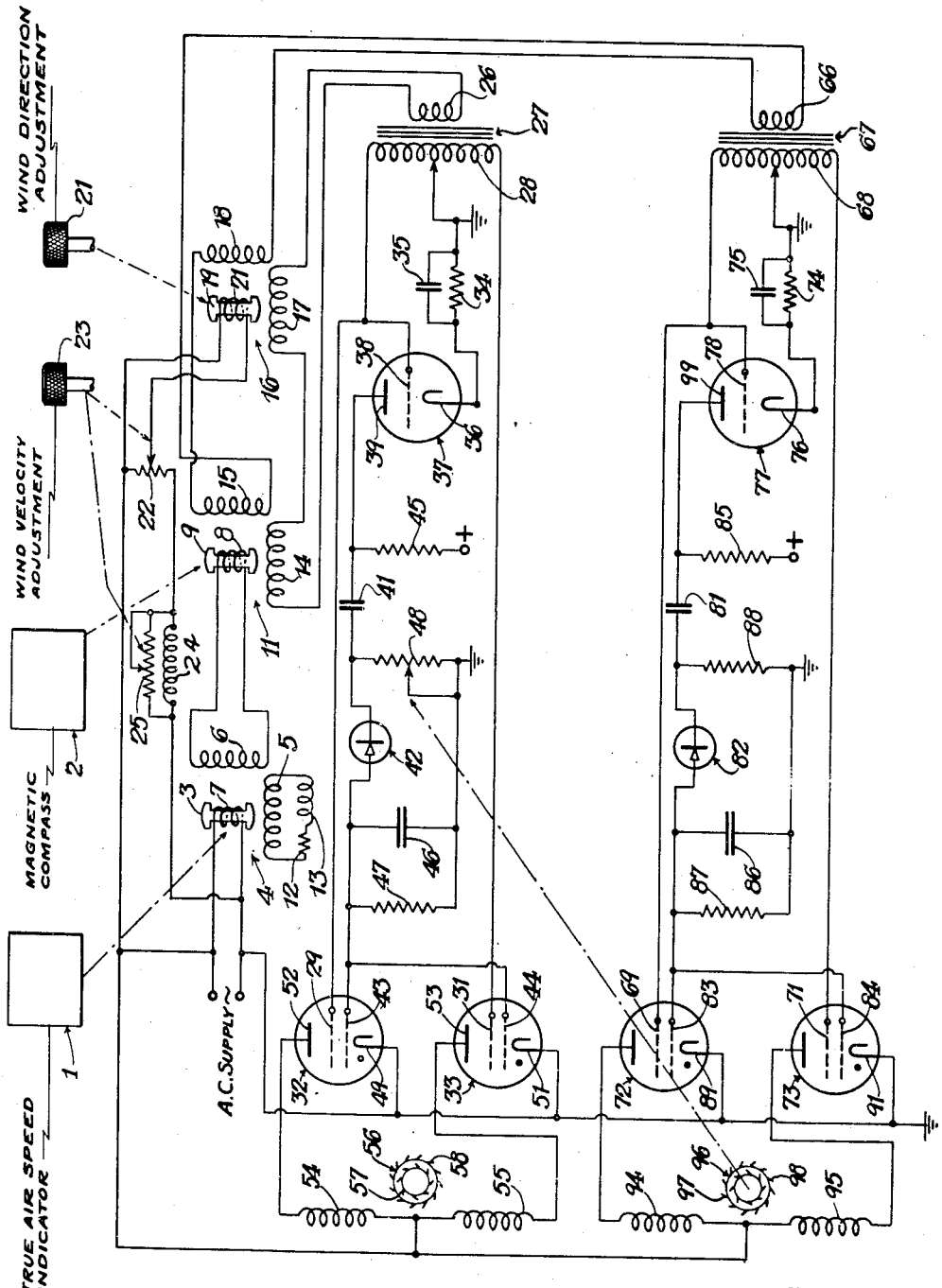
INVENTOR.
JOHN H ANDRESEN, JR.
BY
ATTORNEY.

Patented Apr. 12, 1949

2,467,179

UNITED STATES PATENT OFFICE 2,467,179

AUTOMATIC POSITION INDICATOR

John H. Andresen, Jr., Port Washington, N. Y., assignor to Square D Company, Detroit, Mich., a corporation of Michigan Application March 30, 1945, Serial No. 585,778

16 Claims. (Cl. 73—178)

1

This invention relates to an automatic position indicator more particularly adapted for use in aircraft.

The object of the invention is to provide a simple and accurate automatic register for continuously indicating the position of the aircraft without the necessity for computation.

Another object of the invention is the provision of a position indicator which will correctly interpret the distance-directional vector of the plane's travel in terms of the sine and cosine thereof to provide the longitude and latitude components to indicate the position of the aircraft.

Another object of the invention is the provision of an automatic position indicator incorporating longitude and latitude registers operated through electronic tubes fired by the discharge of condensers whose charging rate is determined by the values of the sine and cosine of the distance-directional vector of the travel of an aircraft.

Another object of the invention is the provision of an automatic position indicator for aircraft incorporating a simple form of correction for the direction and velocity of the wind and/or travel of a carrier base for the aircraft.

Other objects and features of the invention will be readily apparent to those skilled in the art from the specification and appended drawing illustrating a certain preferred embodiment in which the single figure indicates diagrammatically the components of the automatic position indicator according to the present invention.

As illustrated in the drawing, the system operates to interpret the distance-directional vector of the aircraft travel through the true airspeed indicator 1 and a directional responsive instrument 2 bearing the legend of a magnetic compass although any other type of directional indicator may be used.

The true airspeed indicator 1 is connected to rotate the rotor 3 of a rotary transformer 4 having two phase windings 5 and 6, the rotor 3 being energized by the coil 7 from a suitable alternating current source. The stator coil 6 of the rotary transformer 4 is connected to the energizing coil 8 of the rotor 9 of a second rotary transformer 11, the rotor 9 being connected to be rotated by the directional responsive instrument 2. The coil 5 of the rotary transformer 4 is connected to a balancing load represented by the resistance 12 and inductance 13 which serves to neutralize the ordinary electrical torque on the rotor 3. The rotary transformer 11 is provided with a two phase winding represented by the coils 14 and 15 which serve to divide the voltage applied to energizing coil 8 in proportions determined by the position of rotor 9 into the rectangular components corresponding proportionately to the sine and cosine of the distance-directional vector of the travel of the aircraft.

2

The rectangular component voltages thus secured are corrected for wind direction and velocity and/or the direction and speed of travel of a carrier base in a third rotary transformer 16 whose stator coils 17 and 18 are connected in series with the stator coils 14, 15, respectively, of the rotary transformer 11. The position of the rotor 19 of transformer 16 is set manually by the adjustment knob indicated at 21 in accordance with the known wind direction. The energizing coil 21 of the rotor 19 is supplied from a potentiometer coil 22 and the energization is adjustable in magnitude by varying the potentiometer resistance through the manual adjusting knob indicated at 23 which is set in accordance with the known wind velocity. The potentiometer 22 is fed from the same source that energizes coil 7 through phase displacer means constituted by the inductance 24 and adjustable resistor 25 in parallel therewith, the resistor 25 also being adjustable by the setting of the knob 23. The phase displacer means serves to maintain the voltages induced in coils 17 and 18 in phase with the voltages induced in the coils 14 and 15, respectively.

The output of the coils 14 and 17, representing the sine of the distance-directional vector of the aircraft travel as modified by the wind direction and velocity, energizes the primary winding 26 of a phase discriminating transformer 27 having a secondary winding 28, the terminals of which are connected to the shield grids 29 and 31 of gas filled tetrode electronic tubes 32 and 33. The midpoint of the secondary winding 28 is connected through grid bias resistor 34 and by-pass condenser 35 to the cathode 36 of an amplifier tube 37, the grid 38 of which is connected to a terminal of the transformer secondary winding 28. The anode 39 of amplifier tube 37 is connected through coupling condenser 41 and rectifier 42 to the control grids 43 and 44 of the tetrodes 32 and 33. A load resistor 45 is connected in series with the B voltage supply. The anode circuit of tube 37 feeds through rectifier 42 to a controlling condenser 46, the charge on which determines the firing of the tubes 32 and 33. Resistances 47 and 48 are provided to determine the rate of charge of the condenser 46, the resistor 48 being adjustable to vary the operation of the longitude register in accordance with the latitude of the aircraft as will be hereinafter explained. The cathodes 49 and 51 of tubes 32 and 33 are connected to one side of the A. C. supply and the anodes 52 and 53 are connected through register operating coils 54 and 55 to the opposite side of the A. C. supply. The register or counter for the longitude is indicated at 56 and may be of any conventional pawl and ratchet arrangement, there being shown two sets of ratchets 57 and 58 for operating the register in opposite directions as either the coil 54 or the coil 55 is energized.

The output of coils 15 and 18, representing the cosine of the distance-direction vector of aircraft travel as modified by wind direction and velocity, is connected to the primary coil 66 of a phase discriminating transformer 67 having a secondary winding 68 whose terminals are connected to the shield grids 69 and 71 of gas filled tetrode tubes 72 and 73. The circuit for the latitude register indicated at 96 is identical with that previously described for the operation of the longitude register 56 and the parts have been given numerals having the same unit numbers but in the series 66 through 98 corresponding to the numerals 26 through 58, respectively, in the longitude register circuit. It is to be noted that the resistance 88 is fixed since no correction in the latitude recording is required for change in longitude. The latitude register 96 is connected through any conventional mechanical arrangement to effect adjustment of the resistor 48 and hence a change in the charging rate of the condenser 46 to vary the longitude register movement occasioned by a given aircraft travel in accordance with the latitude of the aircraft.

The operation of the indicator is as follows:

The instrument 1 effects rotation of the rotor 3 in accordance with the true airspeed of the aircraft. The voltage induced in the winding 6 is dependent upon the position of the rotor 3 and is therefore a function of the true airspeed. The voltages induced in coils 14 and 15 are functions not only of the position of the rotor 9 but also of the voltage impressed on the energizing coil 8. The energization of the coil 8 is a function of the voltage induced in coil 6 and therefore a function of the true airspeed and the position of the rotor 9 is determined by the directional instrument 2. Hence the voltages induced in windings 14 and 15 are functions of the airspeed and direction of travel of the aircraft and the individual voltages are directly proportional to the sine and cosine, respectively, of the distance-directional vector. The voltages induced in the coils 17 and 18 are functions of the position of the rotor 19 and energization of coil 21. The position of the rotor 19 is determined by the manual setting of the knob 21 in accordance with the wind direction. The energization of the coil 21 is determined by the position of the potentiometer 22 which is set by the manual knob 23 in accordance with the wind velocity. The wind velocity adjustment knob 23 also varies the resistor 25 to insure the in-phase relation of the voltages induced in coils 14, 17 and 15, 18.

The phase discriminating transformers 27 and 67 determine which of each of the pairs of tubes 32, 33 and 72, 73 will fire upon the attainment of a suitable charge on condensers 46 and 86. In the operation of the longitude register, the direction of plane travel for increase or decrease in longitude will determine the phase of the voltage impressed on the shield grids 29 and 31 with respect to the control grids 43 and 44 and will therefore determine which of tubes 32 and 33 will fire. Firing of tube 32 energizes the register coil 54 to operate the register in one direction while firing of tube 33 energizes the register operating coil 55 to operate the register in the opposite direction to either add or subtract to the longitude reading in accordance with the proper direction of aircraft travel. The tube 37 serves as a simple amplifier tube for the energy derived from the rotary transformers and the output of tube 37 serves, through the rectifier 42, to charge the condenser 46, the rate of charge being properly regulated by the selection of the resistors 47 and 48 to give the proper registration on the longitude register. The rate of charge of the condenser 46 will vary with the output of tube 37 which in turn varies in magnitude with the magnitude of the voltage on the primary coil 26 of transformer 27. Thus the greater the output from coil 14 impressed on the transformer coil 26, the greater will be the output of tube 37 and the faster the charge of the condenser 46. Upon the attainment of a predetermined charge upon the condenser the voltage impressed on the control grid 43 or 44, as the case may be, effects firing of the associated tetrode to energize the proper register coil to effect a movement of the longitude register. When the aircraft is moving in one east-west direction the tube 32 will fire each time the condenser 46 reaches its appropriate charge and when the aircraft is traveling in the opposite east-west direction the tube 33 will fire each time the condenser 46 attains the proper voltage. The frequency of firing of the tubes and hence the rapidity of register movement is proportional to the induced voltage representing the sine of the distance-directional vector of travel.

The operation of the latitude register 96 is the same as the operation of the longitude register 56 except that the operation of the register is determined in proportion to the cosine of the distance-directional vector represented by the voltage induced in the coil 15. The variation in resistor 48 occasioned by movement of the latitude register effects the appropriate change in response of the longitude register as the latitude of the plane changes. The two registers 56 and 96 will continuously indicate the position of the aircraft in terms of longitude and latitude without the necessity for the computation of position.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. In an automatic position indicator, speed responsive means, directional responsive means, means for generating a voltage, means for varying said voltage in response to variations in one of said first two mentioned means, means for generating a pair of voltages, means for varying said pair of voltages in response to variations in said first mentioned voltage and in the other of the said first two mentioned means, a longitude register, a latitude register, electronic tubes for effecting operation of said registers as the tubes are fired, and means for effecting firing of said tubes with frequencies dependent on the values of said pair of voltages.

2. In an automatic position indicator, speed responsive means, directional responsive means, means for generating a voltage, means for varying said voltage in response to variations in one of said first two mentioned means, means for generating a pair of voltages, means for varying said pair of voltages in response to variations in said first mentioned voltage and in the other of the said first two mentioned means, a longitude register, a latitude register, electronic tubes for effecting operation of said registers as the tubes are fired, condensers connected to effect firing of said tube upon the attainment of predetermined charges on the condensers, and means for charging said condensers at rates determined by the values of said pair of voltages.

3. In an automatic position indicator, speed responsive means, directional responsive means, means for generating a voltage, means for varying said voltage in response to variations in one of said first two mentioned means, means for generating a pair of voltages, means for varying said pair of voltages in response to variations in said first mentioned voltage and in the other of the said first two mentioned means, a longitude register, a latitude register, electronic tubes for effecting operation of said registers as the tubes are fired, condensers connected to effect firing of said tube upon the attainment of predetermined charges on the condensers, means for charging said condensers at rates determined by the values of said pair of voltages, and means for varying the charging rate of the condenser for the longitude register upon variation in the latitude register.

4. In an automatic position indicator, speed responsive means, directional responsive means, means for generating a voltage, means for varying said voltage in response to variations in one of said first two mentioned means, means for generating a pair of voltages, means for varying said pair of voltages in response to variations in said first mentioned voltage and in the other of the said first two mentioned means, a longitude register, a latitude register, a pair of electronic tubes for each of said registers, the firing of one tube in each pair effecting movement of the associated register in one direction, the firing of the other tube in each pair effecting movement of the associated register in the opposite direction, a pair of phase discriminating means for determining which of the tubes in each pair shall fire in accordance with the direction of travel of the indicator, and means for energizing said phase discriminating means and firing said tubes in accordance with the values of said pair of voltages.

5. In an automatic position indicator for aircraft, speed responsive means, directional responsive means, voltage generating means generating a pair of voltages varying in accordance with variations in said first two mentioned means, said voltages being proportional to the sine and cosine of the distance-directional vector of aircraft travel, longitude and latitude registers, electronic tubes for operating said registers as the tubes are fired, condensers connected to effect firing of said tubes upon the attainment of a predetermined charge on the condensers, and means for charging said condensers at a rate determined by the values of said voltages.

6. In an automatic position indicator, a longitude register, a latitude register, a pair of electronic tubes for each of said registers, the firing of one tube in each pair effecting movement of the associated register in one direction, the firing of the other tube in each pair effecting movement of the associated register in the opposite direction, phase discriminating means for determining which of the tubes of each pair shall fire in accordance with the direction of travel of the indicator, speed responsive means, directional responsive means, and means for effecting firing of said tubes with frequencies dependent on the values of said speed and directional responsive means.

7. In an automatic position indicator for aircraft, speed responsive means, directional responsive means, voltage generating means generating a pair of voltages varying in accordance with variations in said first two mentioned means, said voltages being proportional to the sine and cosine of the distance-directional vector of aircraft travel, longitude and latitude registers, electronic tubes for operating said registers as the tubes are fired, condensers connected to effect firing of said tubes upon the attainment of predetermined charges on the condensers, means for charging said condensers at rates determined by the values of said voltages, and means for varying the charging rate of the condenser for the longitude register upon variation in the latitude register.

8. In an automatic position indicator, speed responsive means, directional responsive means, means for generating a voltage, means for varying said voltage in response to variations in one of said first two mentioned means, means for generating a pair of voltages, means for varying said pair of voltages in response to variations in said first mentioned voltage and in the other of the said first two mentioned means, means for generating a second pair of voltages, means for varying said second pair of voltages in accordance with the speed and direction of a corrective factor, means for adding said second pair of voltages to said first pair of voltages to incorporate the correction therein, position indicator means, and means for effecting operation of said position indicator means in accordance with the values of said corrected pair of voltages.

9. In an automatic position indicator, speed responsive means, directional responsive means, means for generating a voltage, means for varying said voltage in response to variations in one of said first two mentioned means, means for generating a pair of voltages, means for varying said pair of voltages in response to variations in said first mentioned voltage and in the other of the said first two mentioned means, means for generating a second pair of voltages, means for varying said second pair of voltages in accordance with the speed and direction of a corrective factor, means for adding said second pair of voltages to said first pair of voltages to incorporate the correction therein, longitude and latitude registers, electronic tubes for operating said registers as the tubes are fired, and means for effecting firing of said tubes in accordance with the values of said corrected pair of voltages.

10. In an automatic position indicator, speed responsive means, directional responsive means, means for generating a voltage, means for varying said voltage in response to variations in one of said first two mentioned means, means for generating a pair of voltages, means for varying said pair of voltages in response to variations in said first mentioned voltage and in the other of the said first two mentioned means, means for generating a second pair of voltages, means for varying said second pair of voltages in accordance with the speed and direction of a corrective factor, means for adding said second pair of voltages to said first pair of voltages to incorporate the correction therein, longitude and latitude registers, electronic tubes for operating said registers as the tubes are fired, condensers connected to effect firing of said tube upon the attainment of predetermined charges on the condensers, and means for charging said condensers at rates determined by the values of said corrected pair of voltages.

11. In an automatic position indicator, speed responsive means, directional responsive means, means for generating a voltage, means for varying said voltage in response to variations in one of said first two mentioned means, means for generating a pair of voltages, means for varying said pair of voltages in response to variations in said first mentioned voltage and in the other of the said first two mentioned means, means for generating a second pair of voltages, means for varying said second pair of voltages in accordance with the speed and direction of a corrective factor, means for adding said second pair of voltages to said first pair of voltages to incorporate the correction therein, longitude and latitude registers, electronic tubes for operating said registers as the tubes are fired, condensers connected to effect firing of said tube upon the attainment of predetermined charges on the condensers, means for charging said condensers at rates determined by the values of said corrected pair of voltages, and means for varying the charging rate of the condenser for the longitude register upon variation in the latitude register.

12. In an automatic position indicator, a first rotary transformer having a primary and a pair of secondary windings, means for energizing the primary winding of said rotary transformer, true airspeed responsive means controlling the position of said rotary transformer, a second rotary transformer having a primary and a pair of secondary windings, means for energizing a primary winding of said second rotary transformer from one of the secondary windings of said first rotary transformer, a balancing load fed from the second secondary winding of said first rotary transformer to neutralize the electrical torque on the rotor of said first rotary transformer, directional responsive means determining the position of said second rotary transformer, position indicator means, and means for effecting operation of the position indicator means in accordance with the values of the voltages induced in the secondary windings of said second rotary transformer.

13. In an automatic position indicator, a first rotary transformer having a primary and secondary winding, means for energizing said primary winding, speed responsive means, directional responsive means, means for controlling the position of said rotary transformer by one of said responsive means, a second rotary transformer having a primary and a pair of secondary windings, means for energizing the primary of said second rotary transformer from the secondary winding of said first transformer, means for controlling the position of said second rotary transformer from the other of said responsive means, a third rotary transformer having a primary and a pair of secondary windings, each of the secondary windings of said second rotary transformer being connected in series with one of the secondary windings of said third rotary transformer, means for energizing and positioning said third rotary transformer in accordance with the speed and direction of a corrective factor, position indicator means, and means for effecting operation of said position indicator means in accordance with the combined secondary voltages of said second and third rotary transformers.

14. In an automatic position indicator, a first rotary transformer having a primary and secondary winding, means for energizing said primary winding, speed responsive means, directional responsive means, means for controlling the position of said rotary transformer by one of said responsive means, a second rotary transformer having a primary and a pair of secondary windings, means for energizing the primary of said second rotary transformer from the secondary winding of said first transformer, means for controlling the position of said second rotary transformer from the other of said responsive means, a third rotary transformer having a primary and a pair of secondary windings, each of the secondary windings of said second rotary transformer being connected in series with one of the secondary windings of said third rotary transformer, means for adjustably energizing the primary of said third rotary transformer in accordance with a value of a corrective factor, said last mentioned energizing means including adjustable phase displacement means for insuring in-phase relation of the voltages induced in the serially connected secondary windings of said second and third rotary transformers, means for positioning said third rotary transformer in accordance with a second value of said corrective factor, longitude and latitude registers, and means for operating said registers in accordance with the corrected voltages supplied by the secondary windings of said second and third rotary transformer.

15. In an automatic position indicator for aircraft, speed responsive means, directional responsive means, voltage generating means generating a pair of voltages varying in accordance with variations in said first two mentioned means, said voltages being proportional to the sine and cosine of the distance-directional vector of aircraft travel, means for generating a second pair of voltages varying in accordance with variations in the speed and direction of a corrective factor, said second pair of voltages being proportional to the sine and cosine of the distance-directional vector of said corrective factor, means for adding said second pair of voltages to said first pair of voltages to incorporate the correction therein, longitude and latitude registers, electronic tubes for operating said registers as the tubes are fired, condensers connected to effect firing of said tubes upon the attainment of a predetermined charge on the condensers, and means for charging said condensers at rates determined by the value of the corrected pair of voltages.

16. In an automatic position indicator for aircraft, speed responsive means, directional responsive means, voltage generating means generating a pair of voltages varying in accordance with variations in said first two mentioned means, said voltages being proportional to the sine and cosine of the distance-directional vector of aircraft travel, means for generating a second pair of voltages varying in accordance with variations in the speed and direction of a corrective factor, said second pair of voltages being proportional to the sine and cosine of the distance-directional vector of said corrective factor, means for adding said second pair of voltages to said first pair of voltages to incorporate the correction therein, longitude and latitude registers, electronic tubes for operating said registers as the tubes are fired, condensers connected to effect firing of said tubes upon the attainment of a predetermined charge on the condensers, means for charging said condensers at rates determined by the values of the corrected pair of voltages, and means for varying the charging rate of the condenser for the longitude register upon variation in the latitude register.

JOHN H. ANDRESEN, Jr.

REFERENCES CITED

The following references are of record in the file of this patent:

UNITED STATES PATENTS

| Number | Name | Date |
|---|---|---|
| 2,080,186 | Raymond | May 11, 1937 |
| 2,270,991 | Bagno | Jan. 27, 1942 |